US007065952B2

(12) United States Patent
Benecke

(10) Patent No.: US 7,065,952 B2
(45) Date of Patent: Jun. 27, 2006

(54) CHAIN WITH CODED LINKS

(75) Inventor: Rainer Benecke, Herdecke (DE)

(73) Assignee: J.D. Theile GmbH & Co. KG (DE)

( * ) Notice: Subject to any disclaimer, the term of this patent is extended or adjusted under 35 U.S.C. 154(b) by 0 days.

(21) Appl. No.: 10/246,859

(22) Filed: Sep. 19, 2002

(65) Prior Publication Data

US 2004/0016225 A1    Jan. 29, 2004

(30) Foreign Application Priority Data

Jul. 23, 2002   (DE) ........................ 202 11 100 U

(51) Int. Cl.
*F16G 13/18* (2006.01)
(52) U.S. Cl. ................... 59/78; 59/3; 59/84; 59/90
(58) Field of Classification Search .............. 59/78, 59/84, 90, 3
See application file for complete search history.

(56) References Cited

U.S. PATENT DOCUMENTS

| 332,053 | A | * | 12/1885 | Cole | 59/84 |
|---|---|---|---|---|---|
| 2,079,384 | A | | 5/1937 | Page | |
| 2,732,178 | A | * | 1/1956 | Chaney | 59/78 |
| 2,774,213 | A | * | 12/1956 | Gantz | 59/84 |
| 3,123,383 | A | * | 3/1964 | Humpal | 59/78 |
| 3,282,045 | A | * | 11/1966 | Thelan | 59/78 |
| 4,606,096 | A | | 8/1986 | Wood et al. | |
| 4,841,898 | A | | 6/1989 | Ballantyne | |
| 4,850,768 | A | | 7/1989 | Huber | |

FOREIGN PATENT DOCUMENTS

| DE | 125 197 C | 11/1901 |
|---|---|---|
| DE | 12 62 065 B | 2/1968 |
| DE | 202 11 100 U1 | 7/2002 |
| GB | 2151328 A | 11/1984 |
| GB | 2 151 328 A | 7/1985 |

OTHER PUBLICATIONS

Search Report dated Jun. 12, 2004 for counterpart European Patent.

* cited by examiner

*Primary Examiner*—David Jones
(74) *Attorney, Agent, or Firm*—Margaret Polson; Patent Law Offices of Rick Martin, PC

(57) ABSTRACT

The present invention discloses a chain where, upon the stressing of the chain, the links automatically arrange themselves with respect to one another in terms of their position in the chain, preventing any undesired link. A link can be developed in the form, in top view, of a drop or in the form of a keyhole. The described chain is not only suitable for application in lashing loads, but also for use with the manipulation of all accessory chain parts, in which the placement of a link is required, for example shortening hooks, shortening straps or the like.

8 Claims, 1 Drawing Sheet

CHAIN WITH CODED LINKS

CROSS REFERENCE APPLICATIONS

This application claims priority from German application no. 202 11 100.8 filed Jul. 23, 2002.

FIELD OF INVENTION

The present invention relates to a chain with links coded to allow the oriented placement of the link into a link receptor. The coding of the links is formed such that the maximum outer width of the links in the region of the halves pointing in the direction of the load is smaller than in the region of the other halves.

BACKGROUND OF THE INVENTION

Chains with coded links are known in the art and used, for example, for lashing loads. For this purpose the free end of the chain is fastened on the load to be lashed tightly, and a link is inserted into a tightening device for tightening the chain. The chain is subsequently tightened with the tightening device. In order for the chain to be loaded according to specification, it is essential that the link placed into the link receptor of the tightening device engages the link receptor with its narrower half pointing toward the load, which is the link receptor. If the load is secured to the other half of this link, the chain cannot be loaded with its nominal load.

For this reason chains have been developed whose links have a placement coding, such that the oriented emplacement of such a link in the link receptor is possible in the specified direction pointing toward the load. This known coding is marked by stamping the material of the longitudinal shanks to produce outwardly projecting cams on the two longitudinal shanks. The inner width of a link coded in this way is not affected by this stamping for the development of said coding. Due to the cams the maximum outer width of the coded link in the region of the half away from the load is greater than the outer width of the link in the region of its segment to be inserted into a link receptor matched to this width. Such a link can consequently only be inserted with the narrower half into the link receptor. In this way incorrect insertion is effectively prevented.

Such links have been produced for many years and have been applied in unchanged form. Even though these chains do prevent incorrect handling of such a chain when placing a link into a link receptor for lashing loads, there are disadvantages with the known prior art chains. These disadvantages relate to the handling of the known chains, since the links become jammed with one another. Before a chain load is placed onto the chain, it must be ensured that the individual links are not jammed with one another. The handling of such a chain, therefore, entails effort and expenditures.

Building on this discussed prior art, the invention addresses the problem of further developing a chain such that jamming—as described above—is prevented.

This problem is solved according to the present invention by having the inner width of the links correspond at least to the length of the longest-axis cutting across the material forming the cross sectional area of the subsequent link joined with this chain link.

SUMMARY OF THE INVENTION

A primary aspect of the present invention is to provide a chain with coded links which is less prone to jamming than the known prior art chains.

Other aspects of this invention will appear from the following description and appended claims, reference being made to the accompanying drawings forming a part of this specification wherein like reference characters designate corresponding parts in the several views.

In a chain according to the present invention jamming is effectively prevented because, independently of the position of the individual links with respect to one another, the links, upon the stressing of the chain according to specification, automatically arrange themselves with respect to one another in terms of their position. This prevents any undesired link arrangement according to specification.

A link can be developed in the form, in top view, of a drop. However, in order to have available longitudinal shanks extending in segments parallel to one another in that half of the link pointing toward the load with which this link can be placed into a link receptor, one embodiment provides developing the coded links, in top view, in the form of a keyhole.

The described chain is not only suitable for application in lashing loads, but also for use with the manipulation of all accessory chain parts, in which the placement of a link is required, for example shortening hooks, shortening straps or the like.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE DRAWINGS

Figure 1:
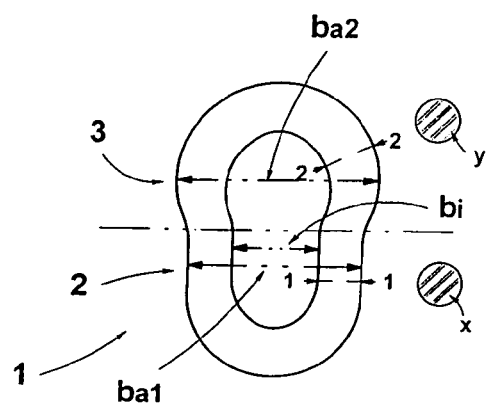
FIG. 1 is a top view of a link coded with respect to its direction of insertion into a link receptor according to a first embodiment.

As shown in FIG. 1, a link 1 of a chain is coded for orientation for insertion of the link 1 into a link receptor, for example a shortening claw. This placement coding is formed in the link 1 such that the half 2 has a lesser outer width $b_{a1}$ than the maximum outer width $b_{a2}$ in the region of the upper half 3. In the FIG. 1 half 2 is the lower one and the one that will point toward the load or toward the load hook. The inner width $b_1$ of link 1 is narrower in the lower half 2 than in the upper half 3. The inner width $b_i$ is always at least as large as the longest axis cutting across the cross sectional area of link 1, or the longest axis of the material forming the link 1.

In the embodiment example depicted in FIG. 1 the chain link 1 has a circular cross sectional shape as is shown in FIG. 1 by the two cross sections. Cross section X is a cross section taken on line 1—1. Cross section Y is a cross section taken along line 2—2. In the depicted embodiment example the material forming the link is a wire. The cross sectional area is of uniform size over the entire link 1. Consequently, the longest axis cutting across the cross sectional area of link 1 is any axis which is tangential to the center point of the cross sectional area or crosses it. The inner width $b_i$ is usefully no greater than the twofold diameter of the wire employed for developing the link 1.

In the lower half 2 of the link 1 the longitudinal shanks extend parallel to one another for some portion of the length. This segment of link 1 serves for the insertion into a link receptor.

A chain comprised of links 1 does not have the hazard that individual links 1 can become jammed with one another. Rather the dimensions of inner width $b_i$ ensure that each subsequent link 1 joined in the chain can align itself as specified when the chain is raised or when a load is secured to it.

Figure 2:
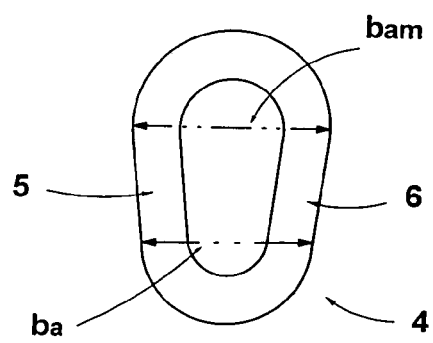
FIG. 2 is a top view of a link coded with respect to its direction of insertion into a link receptor according to a further embodiment.

FIG. 2 depicts in top view another embodiment of the present invention where link 4 is coded with respect to its placement orientation for the formation of a chain. The link 4 has the same properties as link 1 of FIG. 1. In contrast to the formation of link 1, in the chain link 4, starting with the upper maximum outer width $b_{am}$ serving for coding, the two longitudinal shanks 5, 6 are inclined toward one another, such that the outer width $b_a$ in the region of the lower half is smaller than the outer width $b_{am}$.

Figure 3:
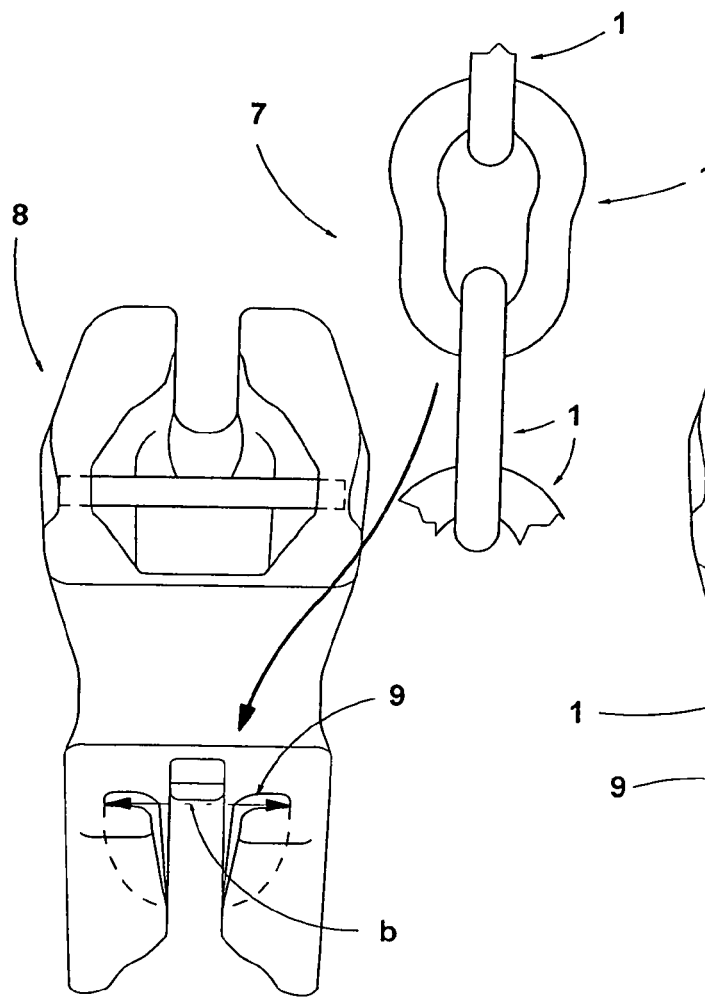
FIG. 3 is a representation of a chain section formed of links corresponding to those of FIG. 1 shown adjacent to a shortening claw with a link receptor.

FIG. 3 depicts a section of a chain 7, which is made up of several links 1. The chain 7 or a link 1 of the chain 7 is intended to be placed into a shortening claw 8. For this purpose the shortening claw comprises in the lower region a link receptor 9 developed in the manner of a pocket. The inner clearance b of link receptor 9 corresponds substantially to the outer width $b_{a1}$ of link 1 in the region of its lower half 2. Between the two dimensionings b and $b_{a1}$, only enough tolerance is provided for the lower half 2 of link 1 to be readily placed into the link receptor 9 of the shortening claw 8.

Figure 4:
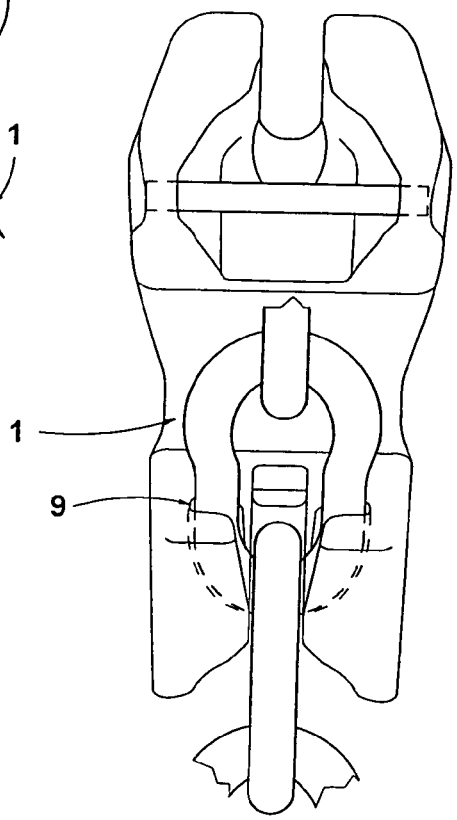
FIG. 4 is the shortening claw of FIG. 3 with a link placed into the chain link receptor.

The link 1 placed in the link receptor 9 is depicted in FIG. 4. This representation shows clearly that the placement of the larger half of 3 link 1 into the link receptor 9 would not be possible due to the greater outer width $b_{a2}$. After all, the inner clearance b of the link receptor 9 is smaller than the outer width $b_{a2}$ of link 1. For this reason, a chain link 1 can only be placed in its specified orientation into the link receptor 9 of the shortening claw 8. Since the lower half 2 of each link 1 is in each instance pointed toward the load or toward a load hook, in the case of chain 7 there is never the hazard that a link 1 could be placed with incorrect orientation into the link receptor 9 of the shortening claw 8.

The cross sectional shape of the material forming the link 1 is usefully uniform over its entire extent. Preferred is a round, in particular circular, cross sectional shape.

The inner width of the coded links 1 is usefully less than the twofold diameter of the material, for example wire, employed for the development of the link. Apart from a uniform cross sectional shape, links 1 are preferably employed, which have the identical material thickness over the extent of the link.

Although the present invention has been described with reference to preferred embodiments, numerous modifications and variations can be made and still the result will come within the scope of the invention. No limitation with respect to the specific embodiments disclosed herein is intended or should be inferred. Each apparatus embodiment described herein has numerous equivalents.

| List of Reference Symbol | |
|---|---|
| 1 | Link |
| 2 | Half pointing toward the load |
| 3 | Half pointing away from the load |
| 4 | Link |
| 5 | Longitudinal shank |
| 6 | Longitudinal shank |
| 7 | Chain |
| 8 | Shortening claw |
| 9 | Link receptor |
| b | Inner clearance |
| $b_a$ | Outer width |
| $b_{a1}$ | Outer width |
| $b_{a2}$ | Outer width |
| $b_i$ | Inner width |

The invention claimed is:

1. A chain having coded links which provide for an oriented placement of any coded link into a link receptor, said coded links comprising:

each coded link being formed of a body having two halves, a load half pointing in a load direction and an opposing half;

said body further comprising two longitunal shanks extending between said two halves, said body having an inner space with a load half inner width and an opposing half inner width;

a maximum outer width of each coded link in a region of the load half being smaller than an outer width in a region of the opposing half;

the smallest inner width of the coded link being equal to or greater than at least a length of a longest axis cutting across a cross sectional area of a subsequent coded link joined to this coded link;

wherein both of said halves are continuously curved along the inner space of the coded link;

wherein the body forming the coded link has the same cross sectional shape throughout the coded link;

wherein a majority of links of the chain are coded; and wherein the longitudinal shanks has a S-form bent section.

2. A chain having coded links which provide for an oriented placement of any coded link into a link receptor, said coded links comprising:

Each coded link being formed of a body having two halves, a load half pointing in a load direction and an opposing half;

said body further comprising two longitunal shanks extending between said two halves, said body having an inner space with a load half inner width and an opposing half inner width;

a maximum outer width of each coded link in a region of the load half being smaller than an outer width in a region of the opposing half;

the smallest inner width of the coded link being equal to or greater than at least a length of a longest axis cutting across a cross sectional area of a subsequent coded link joined to this coded link;

wherein both of said halves are continuously curved along the inner space of the coded link;

wherein the body forming the coded link has the same cross sectional shape throughout the coded link;

wherein a majority of links of the chain are coded; and wherein the longitudinal shanks are formed parallel to one another in the load half pointing in the load direction.

3. A chain having coded links which provide for an oriented placement of any coded link into a link receptor, said coded links comprising:

each coded link being formed of a body having two halves, a load half pointing in a load direction and an opposing half;

said body further comprising two longitunal shanks extending between said two halves, said body having an inner space with a load half inner width and an opposing half inner width;

a maximum outer width of each coded link in a region of the load half being smaller than an outer width in a region of the opposing half;

the smallest inner width of the coded link being equal to or greater than at least a length of a longest axis cutting across a cross sectional area of a subsequent coded link joined to this coded link;

wherein both of said halves are continuously curved along the inner space of the coded link;

wherein the body forming the coded link has the same cross sectional shape throughout the coded link;

wherein a majority of links of the chain are coded; and wherein in the region of the load half pointing toward the load, two longitudinal shanks are disposed substantially parallel to one another such that the coded link is formed in the shape of a keyhole.

4. A chain as claimed in one of claim 1, 2, or 3, wherein the cross sectional shape of the links is circular.

5. In combination with a link receptor, said link receptor having a pocket with an inner clearance b to receive a half of a link, said half of said link having an outer diameter $b_a1$, wherein $b_a1 < b$ a new link wherein the improvement comprises:

a) said new link having a continuous body that forms an inner space; said body having a diameter $d_1$ and having a cross sectional area of uniform shape;

b) said new link having a wider outside diameter (OD) half and a narrower outside diameter half;

c) said peripheral body further comprising a continuously curved inner surface at each of the wider OD half and the narrower OD half;

d) said narrower outside diameter half having a diameter equal to $b_{a1}$;

e) said inside diameter having an inner width $d_1 < bi < 2\,d_1$ f) wherein said wider outside diameter half has a maximum outer width ba2 that cannot fit into the pocket because ba2>b; and g) wherein upon a stressing of a chain comprising a plurality of said new links, said new links automatically arrange themselves with respect to one another in terms of their position.

6. The apparatus of claim 5, wherein the continuous body further comprises a wire having a circular cross sectional shape.

7. The apparatus of claim 6 wherein the narrower outside diameter half further comprises two longitudinal shanks which extend parallel to each other for some portion of their length, forming a keyhole shaped inner space.

8. The apparatus of claim 6, wherein the narrower outside diameter half further comprises two longitudinal shanks which extend inclining towards one another for their entire length, forming a tear drop shaped inner space.

* * * * *